United States Patent
Xi et al.

(10) Patent No.: US 7,297,946 B2
(45) Date of Patent: Nov. 20, 2007

(54) AUTOMATED NANOASSEMBLY

(75) Inventors: Ning Xi, Okemos, MI (US);
Guangyong Li, East Lansing, MI (US);
Heping Chen, East Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 338 days.

(21) Appl. No.: 11/205,201

(22) Filed: Aug. 16, 2005

(65) Prior Publication Data

US 2007/0176100 A1  Aug. 2, 2007

Related U.S. Application Data

(60) Provisional application No. 60/601,785, filed on Aug. 16, 2004.

(51) Int. Cl.
*G01N 13/16* (2006.01)
*G01B 5/88* (2006.01)
*G01B 7/34* (2006.01)

(52) U.S. Cl. .......................... 250/306; 250/307; 73/105
(58) Field of Classification Search ...................... None
See application file for complete search history.

(56) References Cited

U.S. PATENT DOCUMENTS 6,862,921 B2 *  3/2005  Chand et al. .................. 73/105
6,862,924 B2 *  3/2005  Xi et al. ........................ 73/105

OTHER PUBLICATIONS

Ahn, S. J. et al., "AFM nanolithography on a mixed LB film of hexadecylamine and palmitic acid," Ultramicroscopy, vol. 91, pp. 171-176, 2002.
Avouris, P. et al, "Atomic force microscope tip-induced local oxidation of silicon: kinetics, mechanism, and nanofabrication," Applied Physics Letters, vol. 71, pp. 285-287, 1997.
Chen, H. et al., "A General Framework for CAD-Guided Optimal Tool Planning for Free-Form Surfaces in Surface Manufacturing," Journal of Manufacturing Science and Engineering, Feb. 2005.
Dubois, E. et al., "Nanometer scale lithography on silicon, titanium and PMMA resist using scanning probe microscopy," Solid-State Electronics, vol. 43, pp. 1085-1089, 1999.
Guthold, M. et al., "Controlled Manipulation of Molecular Samples with the nanoManipulator," IEEE/ASME Transactions on Mechatronics, vol. 5, No. 2, pp. 189-198, Jun. 2000.

(Continued)

*Primary Examiner*—Nikita Wells
(74) *Attorney, Agent, or Firm*—Harness, Dickey & Pierce, P.L.C.

(57) ABSTRACT

An automated nanomanipulation system is provided for manufacturing a nanoscale structure. The system includes: a design model for the nanoscale structure; image data of a sample surface upon which the nanoscale structure is to be manufactured; a movable member configured to perform a nanomanipulation operation on the sample surface; and a path planning subsystem adapted to receive the design model and the image data. The path planning subsystem generates path data indicative of a path for traversing the movable member along the sample surface such that the movable member manipulates one or more randomly distributed nanoobjects in accordance with the design model.

28 Claims, 11 Drawing Sheets

OTHER PUBLICATIONS

Hansen, L. T. et al., "A technique for positioning nanoparticles using an atomic force microscope," Nanotechnology, vol. 9, pp. 337-342, 1998.

Junno, T. et al., "Controlled manipulation of nanoparticles with an atomic force microscope," Applied Physics Letters, vol. 66, No. 26, pp. 3627-3629, Jun. 1995.

Li, G. Y. et al., "3-D Nanomanipulation Using Atomic Force Microscopy," in Proc. IEEE Int. Conf. Robotics and Automation, Taipei, Taiwan, pp. 3642-3647, Sep. 2003.

Li. G. Y. et al., "Assembly of Nanostructure Using AFM Based Nanomanipulation System," in Proc. IEEE Int. Conf. Robotics and Automation, New Orleans, LA, Apr. 2004, pp. 428-433.

Li, G. Y. et al., "Development of Augmented Reality System for AFM-Based Nanomanipulation," IEEE/ASME Transactions on Mechatronics, vol. 9, No. 2, pp. 358-365, Jun. 2004.

Makaliwe, J. H. et al., "Automatic Planning of Nanoparticle Assembly Tasks," in Proc. IEEE Int'l Symp. on Assembly and Task Planning, Fukuoka, Japan, May 2001, 3pp.

Mokaberi, B. et al., "Towards Automatic Nanomanipulation: Drift Compensation in Scanning Probe Microscopes," in IEEE Int'l Conf. Robotics and Automation, New Orleans, LA, Apr. 2004, 6pp.

Sitti, M. et al., "Tele-Nanorobotics Using Atomic Force Microscope," in Proc. IEEE Int. Conf. Intelligent Robots and Systems, Victoria, B. C., Canada, Oct. 1998, pp. 1739-1746.

* cited by examiner

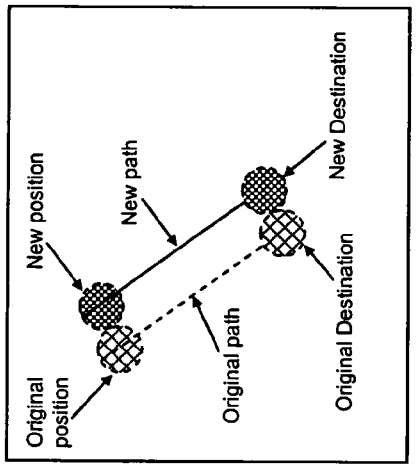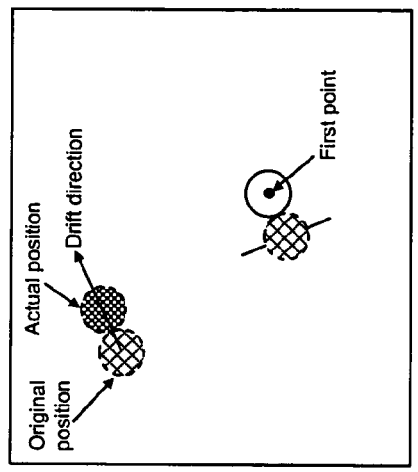

AUTOMATED NANOASSEMBLY

This application claims priority under 35 U.S.C. §119(e) to U.S. Provisional Application No. 60/601,785 filed on Aug. 16, 2004, and entitled "Automated Nanoassembly" the specification and drawings of which are hereby expressly incorporated by reference.

FIELD OF THE INVENTION

The present invention relates to nanotechnology and, more particularly, to a framework for automated nanoassembly of nanoscale structures.

BACKGROUND OF THE INVENTION

Nanoscale materials with unique mechanical, electronic, optical and chemical properties have a variety of potential applications such as nanoelectromecahnical systems (NEMS) and nanosensors. The development of nano-assembly technologies will lead to potential breakthroughs in manufacturing new revolutionary industrial products. The techniques for nano-assembly can be generally classified into bottom-up and top-down methods. Self-assembly in nanoscale is reported as the most promising bottom-up technique, which is applied to make, regular, symmetric patterns of nanoentites. However, many potential nanostructures and nanodevices are asymmetric, which cannot be manufactured using self-assembly only. A top-down method would be desirable to fabricate complex nanostructures.

The semiconductor fabrication technique is a matured "top-down" method, which has been used in the fabrication of microelectromechanical systems (MEMS). However, it is difficult to build nano-structures using this method due to limitations of the lithography in which the smallest feature that can be made must be larger than half the wavelength of the light used in the lithography. Although smaller features can be made by electron beam (e-beam) nanolithography, it is practically very difficult to position the feature precisely using e-beam nanolithography. The high cost of the SEM, ultrahigh vacuum condition, and space limitation inside the SEM vacuum capsule also impede its wide applications.

Atomic force microscopy has been proven to be a powerful technique to study sample surfaces down to the nanoscale. It can work with both conductive and insulating materials and in many conditions, such as air and liquid. Not only can it characterize sample surfaces, it can also modify them through nanolithography and nanomanipulation which are promising nano-fabrication techniques that combine "top-down" and "bottom-up" advantages. In recent years, many kinds of AFM-based nanolithography have been implemented on a variety of surfaces such as semiconductors, metals and soft materials and a variety of AFM-based nanomanipulation schemes have been developed to position and manipulate nanoobjects. However, nanolithography itself can hardly be considered as sufficient for fabrication of a complete device. Thus, manipulation of nanoobjects has to be involved in order to manufacture nanostructures and nanodevices. The AFM-based nanomanipulation is much more complicated and difficult than the AFM-based nanolithography because nanoobjects have to be manipulated from one place to another by the AFM tip and some times it is necessary to relocate the nanoobjects during nanomanipulation while only patterns will be drawn during nanolithography. Since the AFM tip as the manipulation end-effector can only apply a point force on a nanoobject, the pushing point on the nanoobject has to be precisely controlled in order to manipulate the nanoobjects to their desired positions. But positioning errors due to the random drift and the deformation of the cantilever cause the nanoobjects to be easily lost during manipulation or manipulated to wrong places. In the most recently available AFM-based manipulation method, the manipulation paths are obtained either manually using haptic devices or in an interactive way between the users and the atomic force microscope (AFM) images. The main problem of these schemes is their lack of real-time visual feedback. Since the nanoobjects can be easily lost or manipulated to wrong destinations during manipulation using these schemes, the result of each operation has to be verified by a new image scan before the next operation starts. This scan-design-manipulation-scan cycle is usually time consuming and inefficient.

In order to increase the efficiency and accuracy of AFM-based nano-assembly, automated CAD guided nano-assembly is desirable. In the macro-world, CAD guided automated manufacturing has been widely studied. However, it is not a trivial extension from the macro-world to the nanoworld. In the nanoenvironments, the nanoobjects, which include nanoparticles, nanorods, nanowires, nanotubes and etc., are usually distributed on a substrate surface randomly. Therefore, the nanoenvironment and the available nanoobjects have to be modeled in order to design a feasible nanostructure. Because manipulation of nanoparticles only requires translation while manipulation of other nanoobjects such as nanorods involves both translation and rotation, manipulation of nanorods is more challenging than that of nanoparticles. To generate a feasible path to manipulate nanoobjects, obstacle avoidance has to be considered too. Turns around obstacles should also be avoided since turns may cause the failure of the manipulation. Because of the positioning errors due to the random drift, the actual position of each nanoobject has to be identified before each operation. Therefore, it is desirable to develop an automated nanomanipulation system which addresses these and other concerns.

SUMMARY OF THE INVENTION

An automated nanomanipulation system is provided for manufacturing a nanoscale structure. The system includes: a design model for the nanoscale structure; image data of a sample surface upon which the nanoscale structure is to be manufactured; a movable member configured to perform a nanomanipulation operation on the sample surface; and a path planning subsystem adapted to receive the design model and the image data. The path planning subsystem operable to generate path data indicative of a path for traversing the movable member along the sample surface such that the movable member manipulates one or more randomly distributed nanoobjects in accordance with the design model. The system further includes a simulation subsystem for simulating assembly prior to manipulation and a user interface which enables real-time monitoring of the manipulation process by an operator.

In another aspect of the present invention, an automated method is provided for determining manipulation paths for nanoobjects which form a nanoscale structure. The method includes: determining possible direct paths between randomly distributed nanoobjects and destinations for the nanoobjects as specified by a design model, where a direct path is a straight line without any obstacles between a nanoobject and a destination; assigning a randomly distributed nanoobject having a direct path to a destination using a minimum distance criterion; determining a number of destinations which are obstacles along the path of each assigned nanoobject; and setting a manipulation path for the assigned nanoobject having the highest number of obstacles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 14A and 14B are diagrams illustrating how a path may be modified to compensate for thermal drift.

DETAILED DESCRIPTION OF THE PREFERRED EMBODIMENTS

Figure 1:
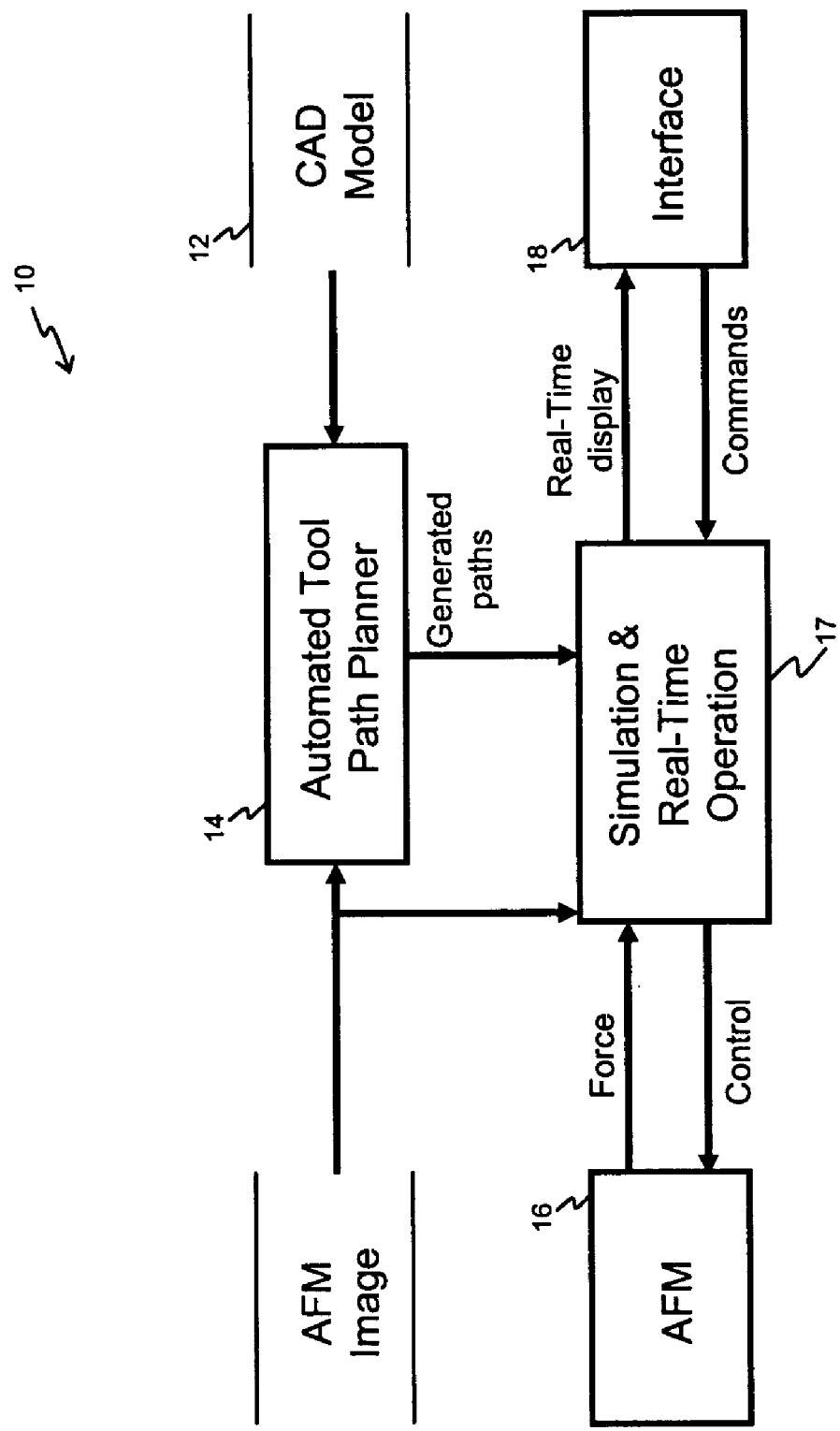
FIG. 1 is a block diagram of an automated nanomanipulation system according to the principles of the present invention.

A general framework for an automated nano-assembly according to the principles of the present invention is illustrated in FIG. 1. The automated nanomanipulation system 10 for manufacturing a nanoscale structure is generally comprised of CAD model 12 for a nanoscale structure; and a nanomanipulation system having an automated path planning subsystem 14. In an exemplary embodiment, the nanomanipulation system employs an atomic force microscope 16 (AFM) to image a sample surface as well as manipulate nanoobjects which reside on the sample surface. Further details regarding an exemplary AFM-based nanomanipulation system are found in U.S. patent application Ser. No. 10/428,578 filed on May 2, 2003 and which is incorporated herein by reference. Although an atomic force microscope is presently preferred, this is not intended as a limitation on the broader aspects of the present invention. On the contrary, other types of scanned-proximity probe microscopes (e.g., scanning tunneling microscopes) may be used as the basis of the nanomanipulation system.

In operation, the atomic force microscope is operable to image the surface of a sample upon which a nanoscale structure is to be constructed. Based on the CAD model and the image data of the sample surface, the path planning subsystem 16 generates manipulation paths for nanoobjects residing on the sample surface. The paths may be simulated through a simulation interface before being fed to the atomic force microscope for execution. The tip of the cantilever on the microscope serves as the member which moves nanoobjects along the sample surface in accordance with the manipulations paths.

The nanomanipulation system 14 may further include a simulation subsystem 17 and a user interface 18. Given path data, the simulation subsystem 17 is operable to simulate the proposed construction of a nanoscale structure. Simulation may be achieved using a software-implemented algorithm. The simulation subsystem 17 is further configured to display the simulation results on the user interface 18. In this way, an operator may verify the feasibility of the design before manipulation occurs. The user interface 18 is also enables real-time monitoring of the manipulation process in a manner known in the art.

Figure 2:
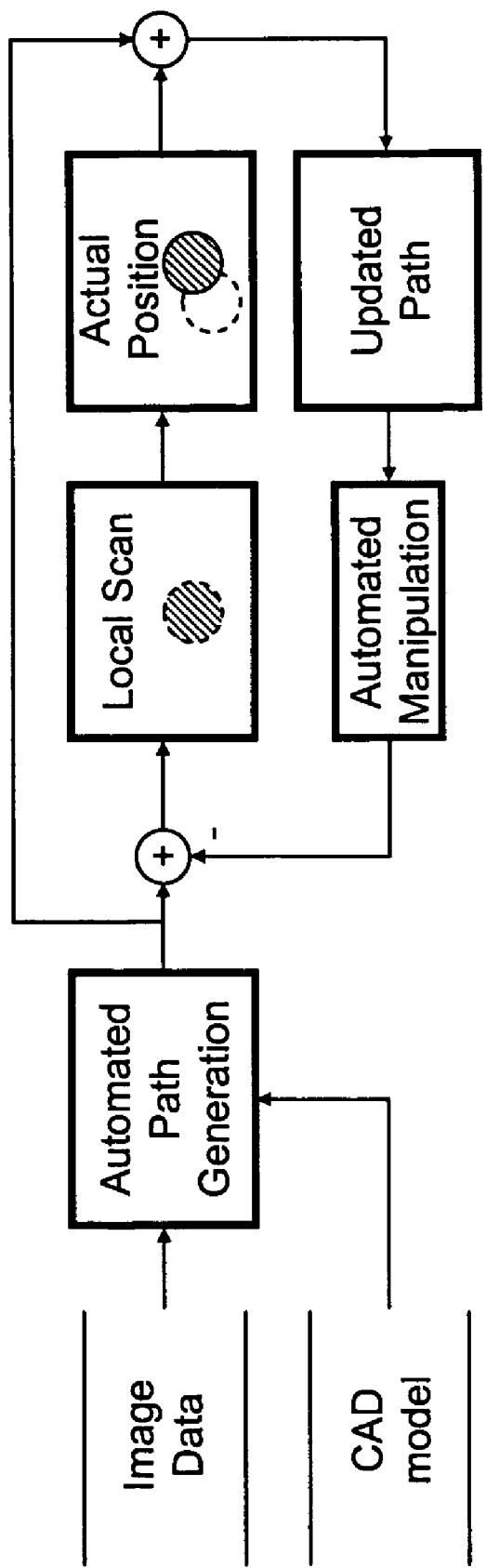
FIG. 2 is a block diagram of a path planning subsystem which is incorporated into the nanomanipulation system of the present invention.

FIG. 2 further illustrates the path planning subsystem 16 of the present invention. Nanoobjects on a surface are first identified based on the AFM image. A nanostructure may be designed using the available nanoobjects. Initially, collision-free manipulation paths are generated based on the CAD model of a designed nanostructure. In order to overcome random drift, a local scanning method is then applied to identify the actual position of a nanoobject before its manipulation. Each manipulation path of the nanoobject is then adjusted accordingly based on its actual position. The regenerated path is then sent to the AFM system to manipulate the nanoobject. The process continues until all nanoobjects are processed and a nanostructure is finally fabricated. There are several concerns which have to be addressed to manufacture nanostructures automatically: identification of nanoobjects; design of a nanostructure; automatically generation of manipulation paths and drift compensation. Each of these concerns is further discussed below.

Figure 4:
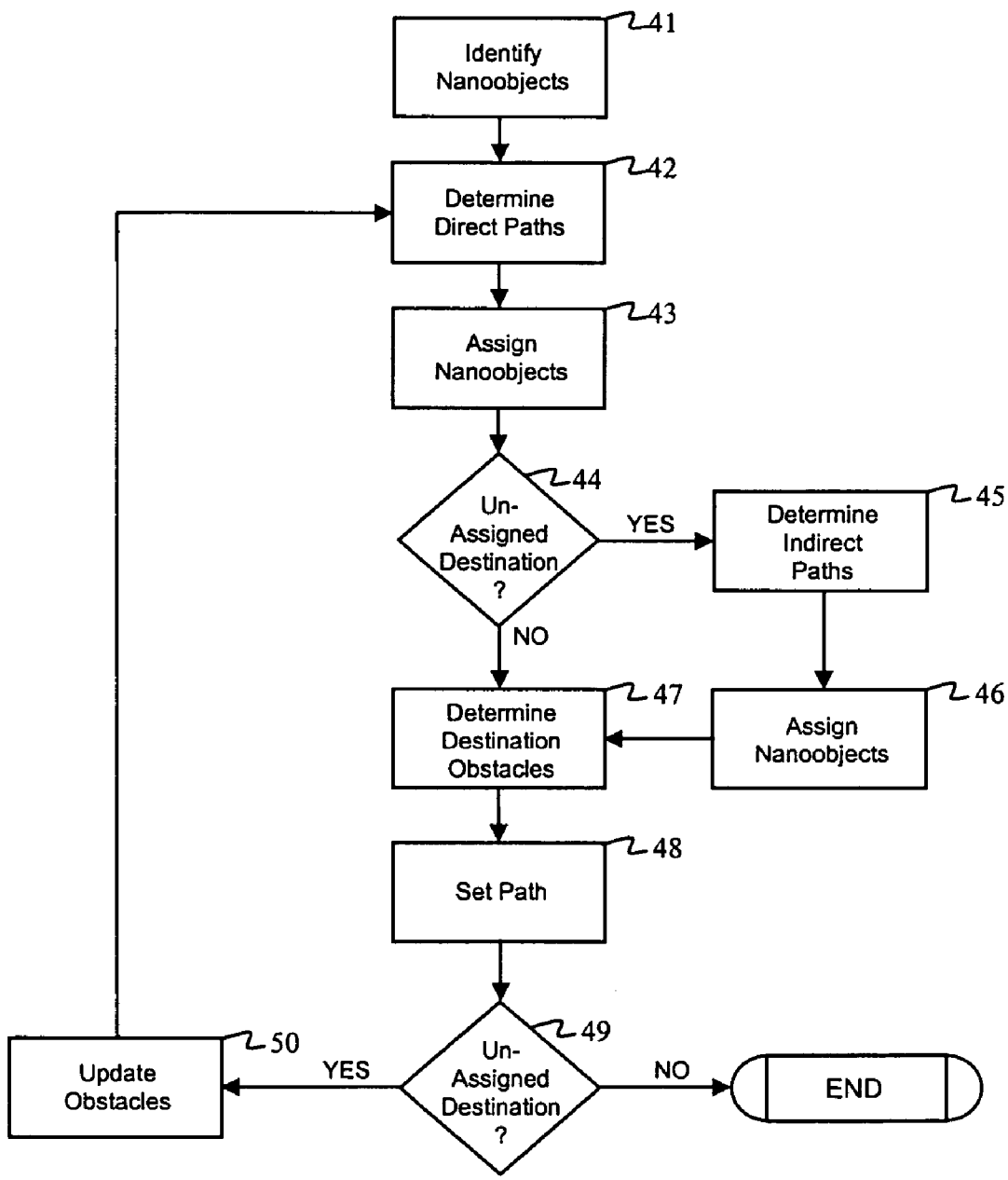
FIG. 4 is a flowchart illustrating an exemplary method for determining manipulation paths in accordance with the present invention.

FIG. 4 depicts an exemplary method for determining manipulation paths in accordance with one aspect of the present invention. Identifying nanoobjects on a surface upon which a nanostructure is to be constructed is a first step as indicated at 41. Because nanoobjects are randomly distributed, the position of each nanoobject has to be determined in order to generate a manipulation path. In addition, nanoobjects have different shapes, such as nanoparticles and nanorods. Thus, the nanoobjects have to be categorized before the manipulation because the manipulation algorithms for these nanoobjects are different.

XY coordinates and height information of each pixel can be obtained from the AFM scanning data. Because the height, shape and size of nanoobjects are known, they are used as criteria to identify nanoobjects and obstacles based on a fuzzy method. For example, all pixels higher than a threshold height are identified. The shapes of clustered pixels are categorized and compared with the ideal shapes of nanoobjects. If the shape of clustered pixels is close to the ideal shape, the pixels are assigned a higher probability ($p_1$). Next, if the height of a pixel is close to the ideal height of nanoobjects, a higher probability ($p_2$) is assigned to it. The neighboring pixels with higher probability ($p_1 p_2$) are counted and the area of the pixels are identified. If the area is close to the size of nanoobjects, the pixels are assigned a higher probability ($p_3$). If the probability ($p_1p_2p_3$) of a pixel is higher than a threshold, it is in a nanoobject. Using the neighboring relationship of pixels, objects can then be identified. The length of a nanoobject can also be calculated by finding the long and short axes using a least square fitting algorithm. If the length-width ratio is larger than a set value, the nanoobject is considered to be a nanorod, otherwise, the nanoobject is categorized as a nanoparticle. It is readily understood that other techniques for identifying and categorizing nanoobjects are within the broader aspects of the present invention.

Figure 3:
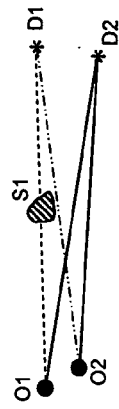
FIG. 3 depicts a two-dimensional CAD model for an exemplary nanostructure which may be constructed using the present invention.
Figure 5:
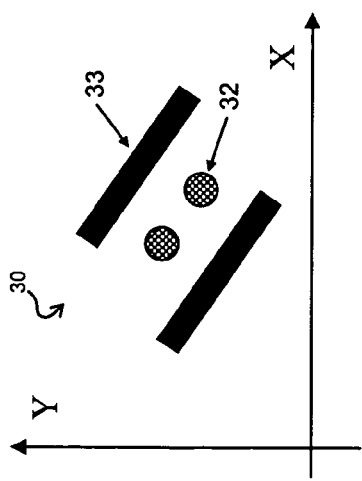
FIG. 5 is a diagram illustrating a direct paths between different objects and different destinations.

FIG. 3 shows a two dimensional CAD model for an exemplary nanoscale structure 30 comprised of two nanoparticles 31 and two nanorods 32. The CAD model is designed using Unigraphics software or some other known CAD tool. From the CAD model of the nanostructure, the positions of the destinations where the nanoobjects will be manipulated can be obtained. It is readily understood that other types of design models which define the spatial relationship between nanoobjects is also within the scope of the present invention.

Since a tip of an AFM can only apply force to a point on a nanoobject in AFM-based nanomanipulation, it is very challenging to generate manipulation paths for nanoobjects, especially for nanorods because manipulation of nanoparticles only requires translation while that of nanorods involves translation as well as rotation. To generate a feasible path to manipulate nanoobjects, obstacle avoidance has to be considered. Turns around obstacles should be avoided since turns may cause the failure of manipulation.

Once nanoobjects and other obstacles have identified, possible direct paths are determined at 42 between the randomly distributed nanoobjects on the sample surface and the destinations for the nanoobjects as specified by the design model. Referring to FIG. 4, a direct path is a connection from an object to a destination using a straight line without any obstacles or potential obstacles along the path. The paths from O2 to D2 and from O1 to D2 are direct paths; whereas, the path between O1 and D1 is not a direct path due to the collision with S1. Due to the van der Waals force between an object and an obstacle, the object may be attracted to the obstacle if the distance between them is too small. Therefore, when assessing a valid path, the minimum distance has to be determined first to avoid this attraction.

Figure 6A:
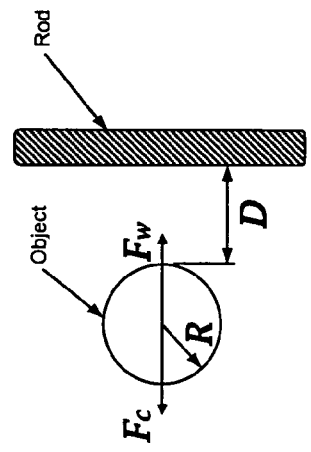
FIGS. 6A and 6B are diagrams illustrating the van der Waals force between a particle object and a particle obstacle and a rod obstacle, respectively.
Figure 6B:
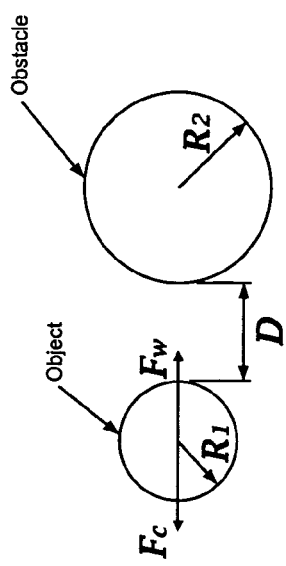

FIGS. 6A and 6B show a particle object 61 in relation to a particle obstacle 62 and a rod obstacle 63, respectively. In the first case, all objects and obstacles are assumed to be spheres, the van der Waals force can be expressed as:

$$F_W = \frac{-A}{6D} \frac{R_1 R_2}{R_1 + R_2}$$

where $F_W$ is the van der Waals force; A is the Hamaker constant; D is the distance between the two spheres; $R_1$ and $R_2$ are the radius of the two spheres.

When the obstacle is a rod, we can use the van der Waals force between a nanoparticle and a surface to approximate the van der Waals force between the nanoparticle and a nanorod because the length of a nanorod is much longer than the radius of a nanoparticle. The van der Waals force between a nanoparticle and a surface can be expressed as:

$$F_W = \frac{-AR}{6D} \quad (2)$$

where $F_W$ is the van der Waals force; D is the distance between a nanoparticle and a nanorod; R is the radius of the two spheres.

Different materials have different Hamaker constants. Nevertheless, the hamaker constants are found to lie in the range (0.4-4)×10-19 J. If an object is not attracted to an obstacle, the van der Waals force between an object and a destination has to be balanced by the friction force between the object and the surface. The friction force between the object and the surface can be formulated as:

$$F_c = \mu_{os} F_{os}^r + \nu F_{os}^a \quad (3)$$

where $F_c$ is the friction force; $\mu_{os}$ is the sliding friction coefficient between an object and the substrate surface; $\nu$ is the shear coefficient; $F_{os}^r$ is the repulsive force and $F_{os}^a$ is the adhesive force. When pushing an object, the minimum repulsive force equals to the adhesive force. Then equation (3) becomes $$F_c = (\mu_{os} + \nu) F_{os}^a \quad (4)$$

The adhesive force $F_{os}^a$ can be estimated by [18]:

$$F_{os}^a = \frac{A_{os}}{A_{ts}} F_{ts}^a \quad (5)$$

where $A_{os}$ is the nominal contact area between an object and a substrate surface; $A_{ts}$ is the nominal contact area between the AFM tip and the substrate surface; $F_{ts}^a$ is the adhesive force between the AFM tip and the surface which is measured.

Since the van der Waals force has to be balanced by the friction force during manipulation, the minimum distance $D_{min}$ can be calculated using equations (1, 2, 4 and 5):

$$D_{min} = \begin{cases} \frac{AR}{6} \frac{A_{ts}}{(\mu_{os} + \nu)A_{os} F_{ts}^a}, \\ \text{where the obstacle is a nanorod} \\ \frac{A}{6} \frac{R_1 R_2}{R_1 + R_2} \frac{A_{ts}}{(\mu_{os} + \nu)A_{os} F_{ts}^a}, \\ \text{where the obstacle is a nanoparticle} \end{cases} \quad (6)$$

The distance between an object and a rod must be larger than $D_{min}$ during manipulation. If there is an obstacle which is close or on the straight line, the path formed by the straight line is not considered as a direct path. For example, the path between O2 and D1 is not a direct path due to the attraction. This means that any obstacle cannot block the direct path between an object and a destination.

From amongst all of the possible direct paths, one object is assigned at step 43 to each destination. More specifically, objects are assigned to destinations using a minimum distance criterion. In some instance, there may be destinations which do not have any objects assigned to them. In other words, there were no direct paths from any of the available objects to these destinations. Therefore, indirect paths may be generated as indicated at 45.

During nanomanipulation, a path with turns has a much higher risk of losing objects than a direct path. A surface has to be scanned again if an object is lost during manipulation. Because the scanning time is much longer than the manipulation time, turns should be avoided during nanomanipulation. To solve the problem, a virtual-object-destination algorithm is developed.

Figure 7A:
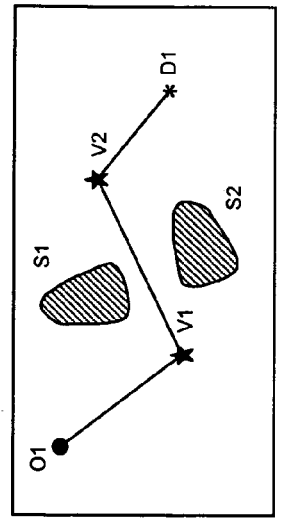
FIGS. 7A and 7B are diagram illustrating an indirect path having one or more intermediate destinations along the path.
Figure 7B:
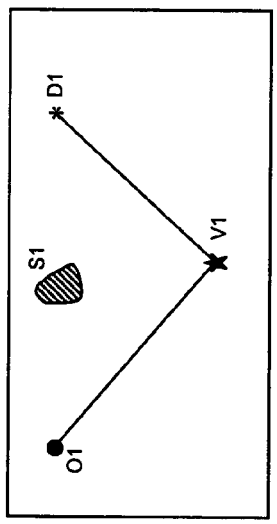

Referring to FIGS. 7A and 7B, an object and a destination may be connected using one or more virtual-object-destinations (VOD). Since there are many possible VODs to connect an object and a destination, a minimum distance criterion is applied to find a VOD. The total distance to connect an object and a destination through a VOD is, $$d = \sqrt{(x_2-x_0)^2 + (y_2-y_0)^2} + \sqrt{(x_2-x_1)^2 + (y_2-y_1)^2} \quad (7)$$

where $x_2, y_2$ are the coordinates of the center of VOD; $x_0, y_0$ are the coordinates of the center of an object and $x_1, y_1$ are the coordinates of the center of a destination. Likewise, connections between the object, the VOD, and its destination have to avoid any obstacles, i.e, $$\sqrt{(x-x_s)^2 + (y-y_s)^2} \geq D_{min} + R' \quad (8)$$

where x, y are the coordinates of the object center along the path; $x_s$, $y_s$ are the coordinates of the center of the obstacle. R' is defined as $$R' = \begin{cases} R, & \text{the obstacle is a nanorod} \\ R_1 + R_2, & \text{the obstacle is a nanoparticle} \end{cases} \quad (9)$$

Then a constrained optimization problem is formulated:

$$\min_{x_2, y_2} d \sqrt{(x_2 - x_0)^2 + (y_2 - y_0)^2} + \sqrt{(x_2 - x_1)^2 + (y_2 - y_1)^2} \quad (10)$$

$$\text{subject to: } \sqrt{(x - x_s)^2 + (y - y_s)^2} \geq D_{min} + R'$$

This is a single objective constrained optimization problem. A quadratic loss penalty function method is adopted to deal with the constrained optimization problem by formulating a new function G(x):

$$\min_{x_2, y_2} G(x) = \min_{x_2, y_2} d + \beta(\min[0, g])^2 \quad (11)$$

where β is a big scalar and g is formulated using the given constraint, i.e.

$$g = \sqrt{(x-x_s)^2 + (y-y_s)^2} - (D_{min} + R') \quad (12)$$

Then the constrained optimization problem is transferred into an unconstrained one using the quadratic loss penalty function method. The pattern search method is adopted here to optimize the unconstrained optimization problem to obtain the VOD.

If one VOD can not reach an unassigned destination, then two or more intermediate VODs have to be found to connect an object and a destination as shown in FIG. 7B. Similarly, the total distance to connect the object and destination can be calculated. The constraint is the same as equation (10). Then a multi-variable constrained optimization problem can be formulated to obtain the VODs.

Once an indirect path has been determined and assigned for each destination, the number of destinations which may become obstacles along each path is assessed at 47. When an object is manipulated to a destination, the destination may become an obstacle (destination obstacle) for other paths. Before an object is pushed to its destination, it could also be an obstacle for other objects (object obstacle). An object priority index (OPI) of an object is the number of objects which are obstacles along the path between the object and a destination. A destination priority index (DPI) of a destination is the number of destinations which are obstacles along the direct path between the destination and its assigned object. Therefore, the path having the highest number of destination obstacles (i.e., the maximum DPI) is set at 48 as a manipulation path.

The object associated with this manipulation path is removed from the list of available nanoobjects. Likewise, the destination associated with this manipulation path has been achieved and thus is considered as an obstacle for subsequent path determinations. This process is then repeated until a manipulation path has been set for each of the destinations.

The manipulation of a nanorod is much more complicated than that of a nanoparticle because there are both translation and rotation during manipulating a nanorod. A nanorod can only be manipulated to a desired position by applying force alternatively close to its ends. From an AFM image, nanorods can be identified and represented by their radius and two end points. Each end point on a nanorod has to be assigned to the corresponding point on the destination. The starting pushing point is important since it determines the direction along which the object moves. By choosing a suitable step size, an AFM tip path can then be generated.

Figure 8A:
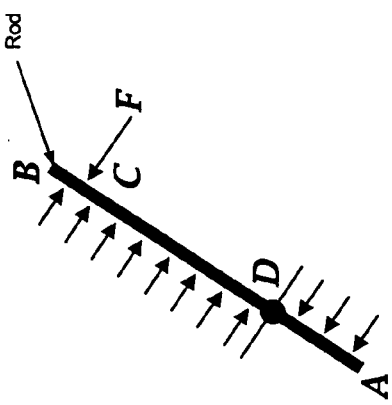
FIGS. 8A and 8B are diagrams illustrating behavior models for a nanorod under a pushing force.
Figure 8B:
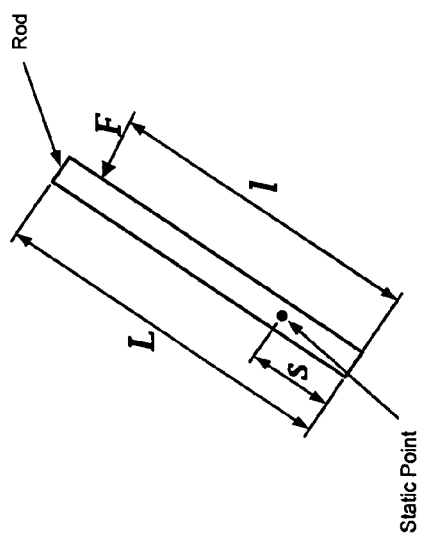

To automatically manipulate a nanorod, nanorod's behavior under a pushing force has to be modeled. When a pushing force is applied to a nanorod, the nanorod starts to rotate around a pivot if the pushing force is larger than the friction force. FIG. 8A shows the applied pushing force and the pivot. The nanorod rotates around point D when it is pushed at point C by the AFM tip. The nanorod under pushing may have different kinds of behavior, which depends on its own geometry property. The pushing force F from the tip causes the friction and shear forces along the rod axis direction when the pushing direction is not perpendicular to the rod axis. Since the force along the rod axis direction hardly causes the rod to move along the rod axis direction, the rod can be simplified as a straight line. The external forces applied on the rod in surface plane can be modeled as shown in FIG. 8B. The pivot D can be either inside the rod or outside the rod. First, assume that D is inside the rod. In this case, all the torques around D are self balanced during smooth motion.

$$F(l-s) = \frac{1}{2}f(L-s)^2 + \frac{1}{2}fs^2 \quad (13)$$

where F is the applied external force; $f$ is the evenly distributed friction and shear force density on the rod; L is the length of the rod; s is the distance from one end of the rod (point A in FIG. 8B) to the pivot D; l is the distance from A to C, where the external force is applied. Equation (13) can be written as:

$$F = \frac{f(L-s)^2 + fs^2}{2(l-s)} \quad (14)$$

The pivot can be found by minimizing F with respect to s, i.e.

$$\frac{dF}{ds} = 0 \Rightarrow s^2 - 2ls + lL - L^2/2 = 0 \quad (15)$$

Since we have assumed that 0<s<L, a unique solution of the pivot for any 0<l<L except l=L/2 can be determined by $$s = \begin{cases} 1 + \sqrt{l^2 - lL + L^2/2} & l < L/2 \\ l - \sqrt{l^2 - lL + L^2/2} & l < L/2 \end{cases} \quad (16)$$

The detailed behavior model of a nanorod can be found in previous work.

Figure 9:
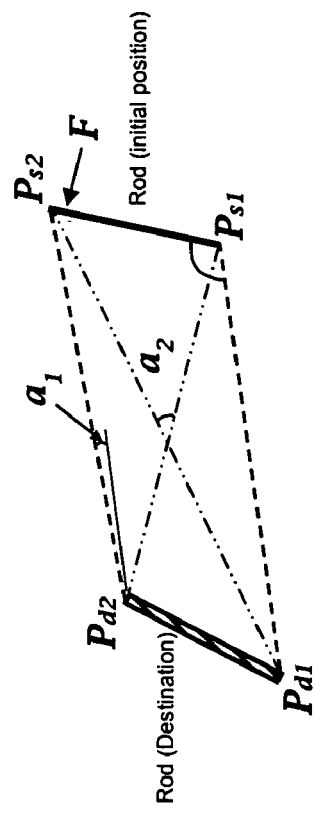
FIG. 9 is a diagram illustrating the initial position of a nanorod in relation to its destination position.

The corresponding points between a nanorod and its destination have to be matched in order to plan a manipulation path. FIG. 9 shows the initial position and the destination of a rod. $P_{s1}$ and $P_{s2}$ are the initial positions; $P_{d1}$ and $P_{d2}$ are the destinations.

The angles $\alpha_1$ and $\alpha_2$ in FIG. 9 can then be calculated. Based on the angle $\alpha_1$ and $\alpha_2$, the corresponding points can be determined. If $\alpha_1 < \alpha_2$, $P_{s1}$ is manipulated to $P_{d1}$ and $P_{s2}$ to $P_{d2}$. Otherwise, $P_{s2}$ is manipulated to $P_{d1}$ and $P_{s1}$ to $P_{s2}$.

The nanorod moves downward if the starting pushing point is close to $P_{s2}$. Similarly, the nanorod moves upward if the starting pushing point is close to $P_{s1}$. The starting pushing point can be determined by the angle β as shown in FIG. 9. If β>90°, the starting pushing point should be close to $P_{s2}$; otherwise, $P_{s1}$.

Figure 10:
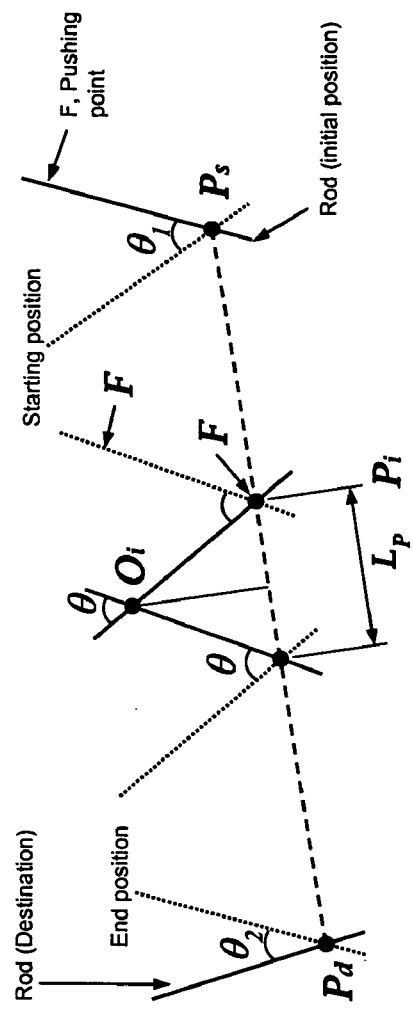
FIG. 10 is a diagram illustrating the manipulation of a nanorod in accordance with the present invention.

FIG. 10 shows the process to manipulate a nanorod from its initial position to its destination. When the alternating pushing forces at two points on the nanorod are applied, a nanorod rotates around two pivots $P_i$ and $Q_i$. The distance L1 between $P_i$ and $Q_i$ can be calculated if the pushing points are determined. The two pivots $P_s$ and $P_d$ are connected to form a straight line and the distance d between the two points is calculated. d is then divided into N small segments (the number of manipulation). Then $L_p$ in FIG. 10 can be obtained:

$$L_p = \frac{d}{N}, 0 < L_p < 2L_1. \quad (17)$$

During manipulation, the pivot $P_i$ is always on the line generated by the two points $P_s$ and $P_d$. Then the rotation angle for each step can be obtained, $$\theta = 2a\cos\left(\frac{L_p}{2L_1}\right) \quad (18)$$

Figure 11:
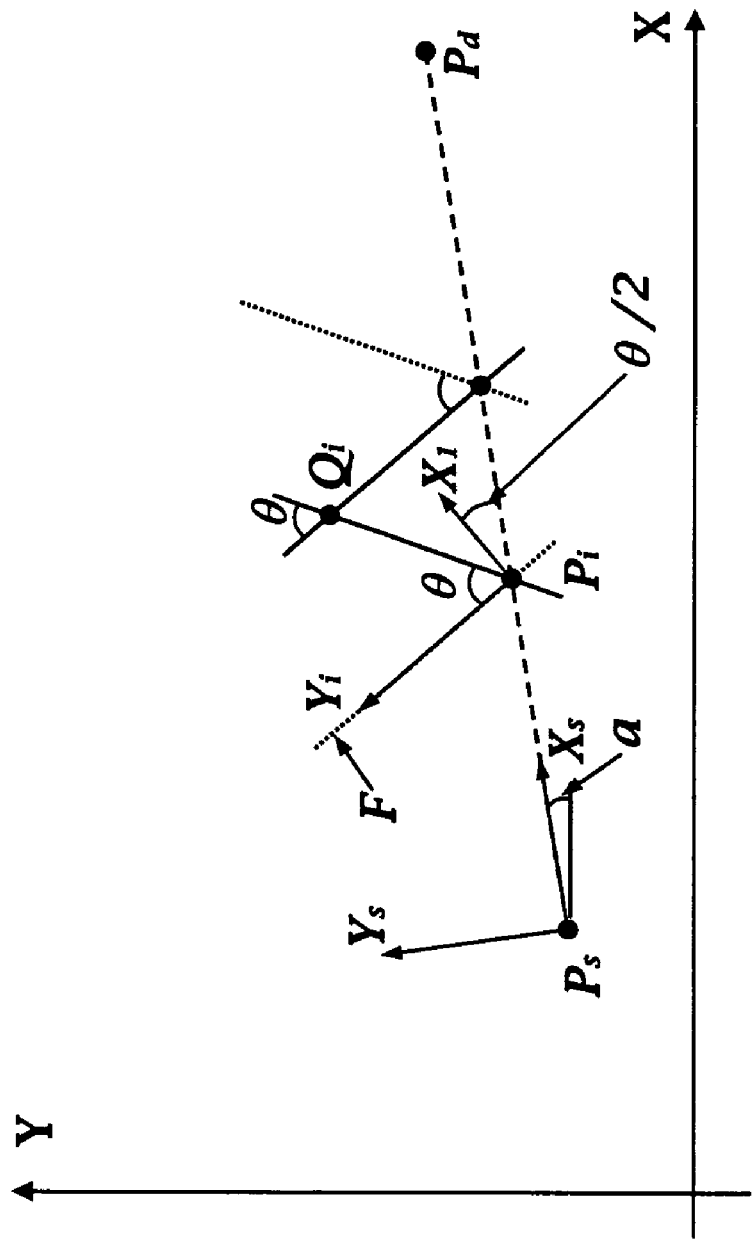
FIG. 11 is a diagram illustrating how to determine the pushing points when a nanorod is rotated.

The rotation angle θ stays the same during manipulation. The initial pushing angle θ1 and the final pushing angle θ2 in FIG. 10 can be calculated by finding the starting position and the ending position. After θ is determined, the pivots $P_i$ and $Q_i$ (i=1, . . . , N) can be calculated. The pushing points can then be determined. Here we show how to determine the pushing points when a rod rotates around the pivot $P_i$ as an example. FIG. 11 shows the frames used to determine the tip position.

The following transformation matrix can be easily calculated. The transformation matrix of the frame originated at $P_s$ relative to the original frame is $T_s$. The transformation matrix of the frame originated at $P_i$ relative to the frame originated at $P_s$ is $T_i$. Suppose the rotation angel is β (0<β≤θ), the transformation matrix relative to the frame originated at $P_i$ is $T_{\beta i}$. β can be obtained by setting a step size of manipulation. The coordinates of the pushing point can then be calculated:

$$\begin{bmatrix} X_F \\ Y_F \\ 1 \end{bmatrix} = T_s T_i T_{\beta i} \begin{bmatrix} 0 \\ L - 2s \\ 1 \end{bmatrix} \quad (19)$$

Similar steps can be followed to determine the pushing position for a nanorod rotating around the pivot $Q_i$, i∈[1,N]. After the coordinates of the pushing point is obtained, the manipulation path for a nanorod can then be generated.

Random drift due to the thermal extension or contraction causes a major problem during nanomanipulation because the object may be easily lost or manipulated to wrong destinations. Before the manipulation, the objects on the surface are identified and their positions are labeled based on a previously captured AFM image. However, the labeled positions of the nanoobjects have errors after the system switching from image mode to manipulation mode due to the random drift. To compensate for the random drift, the actual position of each nanoobject has to be recovered before each operation. Because the scanning time is quite long to scan a big area, a quick local scanning action is performed to obtain the actual initial position of each nanoobject in a short time. Nanomanipulation is then performed immediately after the local scan. The local scan mechanism makes the movie-like real-time image display during manipulation reliable especially for the starting and ending positions. Nanoparticles, nanorods, nanotubes, and nanowires are the most often used materials for AFM based nano-manufacturing. Most nanoobjects used for nano-manufacturing usually have nice and regular shape such as nanocrystals, nanowires, carbon nanotubes, and DNA molecules. The local scan mechanism for rigid nano-objects such as nanoparticles and nanorods is discussed in details in the followings.

Figure 12:
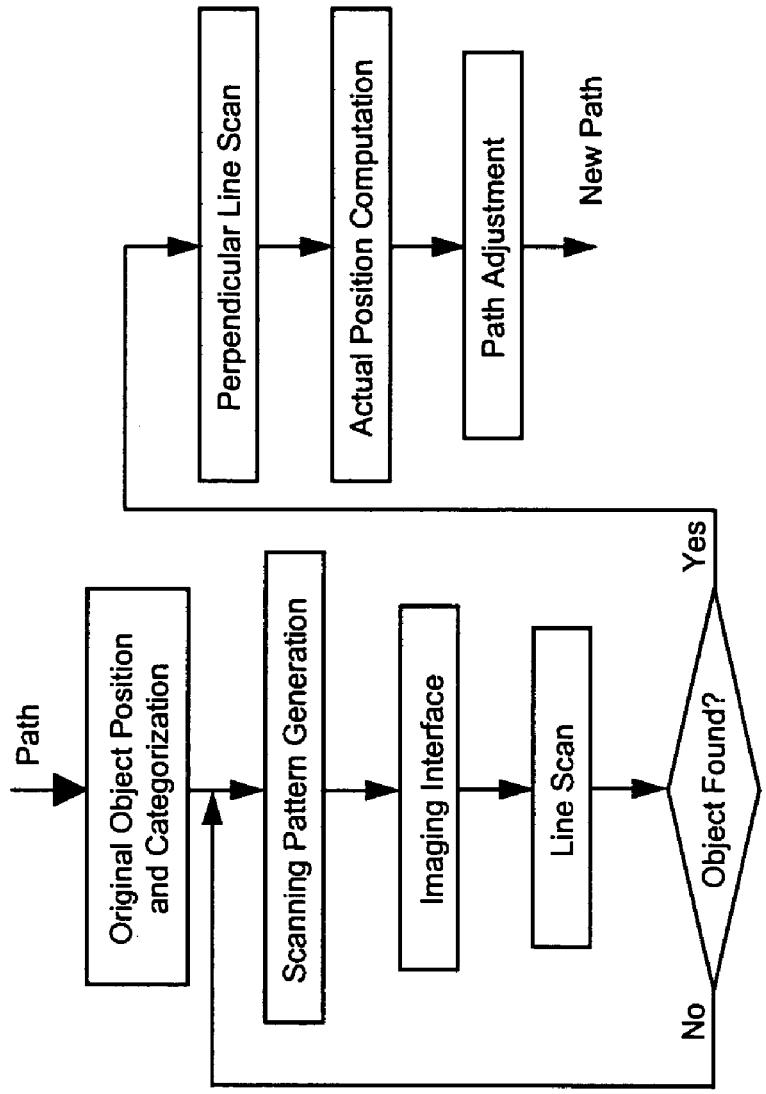
FIG. 12 is a flowchart depicting an exemplary method for compensating for thermal drift of a nanoobject in accordance with the present invention.

FIG. 12 shows the local scanning method. From the path data, the original position of a nanoobject is obtained. Also the nanoobject is categorized into two groups: nanoparticle and nanorod. A scanning pattern is generated for the nanoobject according to its group. It is then fed to the imaging interface to scan the surface. If the nanoobject is not found, a new scanning pattern is generated. The process continues until the nanoobject is discovered. The actual position of the nanoobject can then be computed. The manipulation path is then adjusted based on the actual position. For nanoparticles and nanorods, different scanning patterns have to be used in order to obtain their actual position.

The location of a nanoparticle can be approximately represented by its center and radius. The radius of each particle, R, is identified from a previously captured AFM image before the manipulation starts. Due to the thermal drift and model errors, the displayed position may not represent the actual position. The actual center of a nanoparticle can be recovered by two local scan actions before and after each manipulating operation. The local-scan-before-operation can eliminate the thermal drift, while the local-scan-after-operation mainly minimizes the effects of model errors—correcting the final position of the nanoparticle.

Figure 13:
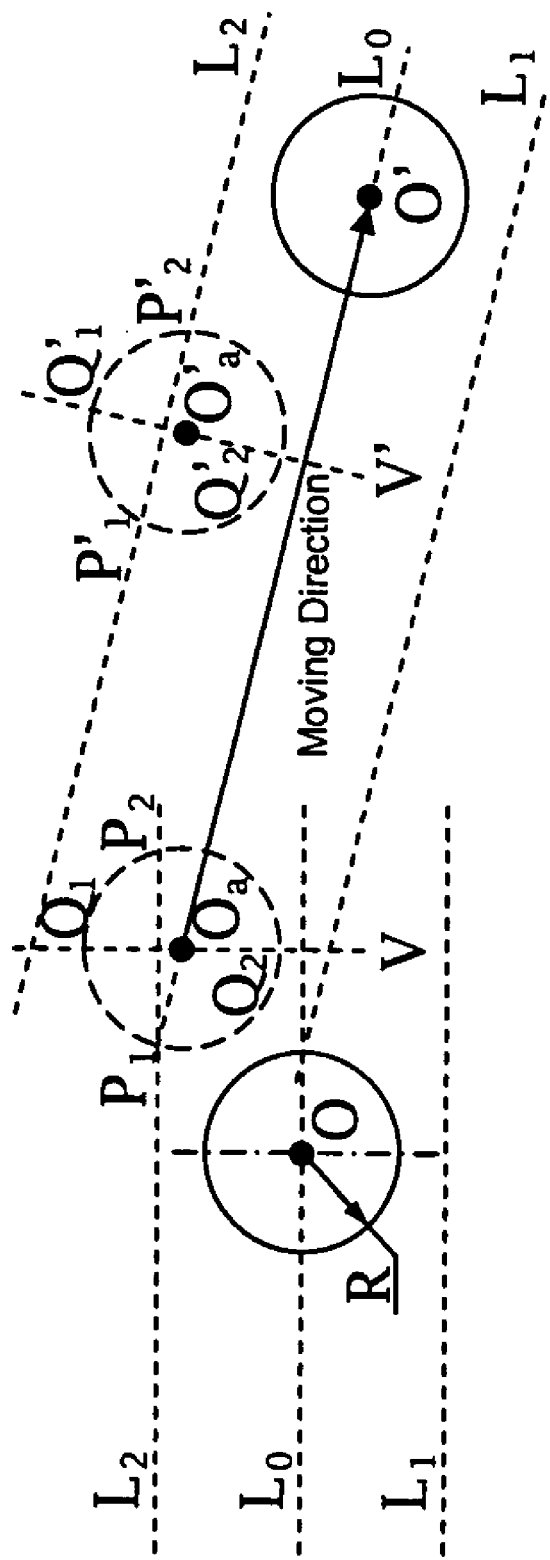
FIG. 13 is a diagram illustrating a local scan pattern for locating a nanoparticle to be manipulated.

The local-scan-before-operation needs at least two scanning lines, one or more horizontal lines and one vertical line as shown in the left part of FIG. 13. First, the nano-particle is scanned using Line $L_0$, which passes through point O, the displayed center of the particle in the image. If the particle is not found, then the scanning line moves up and down alternatively by a distance of 3/2R until the particle is found. Once the particle is found, the scanning line forms two intersection points with the boundary of the particle, $P_1$ and $P_2$. Additional vertical line, V, which goes through the midpoint between $P_1$ and $P_2$ and perpendicular to the previous scanning line, is scanned to find the actual center of the particle. The vertical scanning line has two intersection points with the boundary of the particle, $Q_1$ and $Q_2$. The actual center of the nano-particle, $O_a$, is located at the midpoint between $Q_1$ and $Q_2$. The local scanning range (the length of the scanning line, l) is determine by the maximum random drift such that $l > R + r_{max}$, where $r_{max}$ is the maximum random drift distance After the center of a nanoobject is identified, the drifts in the XY directions are calculated. The drifts in the XY directions are then used to update the destination position as shown in FIG. 14(a). Finally a new path is generated to manipulate the nanoparticle.

The local-scan-after-operation has to be performed immediately after each manipulating operation in order to correct the position errors in the real-time display. At least two scanning lines are needed for the local-scan-after-operation as shown in the right part of FIG. 13. First, the nanoparticle is scanned using Line $L'_0$, which passes through the initial actual center and along the tip motion direction. If the particle is not found, then the scanning line moves up and down alternatively by a distance of 3/2R until the particle is found. Once the particle is found, the scanning line forms two intersection points with the boundary of the particle, $P'_1$ and $P'_2$. Another line, V', which goes through the midpoint between $P'_1$ and $P'_2$, and perpendicular to the previous scanning line, is scanned to find the actual center of the particle. The last scan line has two intersection points with the boundary of the particle, $Q'_1$ and $Q'_2$. The final actual center of the nanoparticle, $O'_a$, is located at the midpoint between $Q'_1$ and $Q'_2$. The local scanning range (the length of the scanning line, l') is determine by the maximum random drift and the pushing distance such that $l' > \Delta + 2(R + r_{max})$, where $\Delta$ is the pushing distance. The visual display is updated immediately after the actual position obtained. The updated position will work as the new reference for the next operation on the same particle. The system is ready for next manipulating operation after updating the image with the final actual position of the manipulated nanoparticle After the local scan of the first nanoparticle, the direction and size of the drift can be estimated. The information can be used to generate the scanning pattern for the next nanoparticle as shown in FIG. 14(b).

Figure 15:
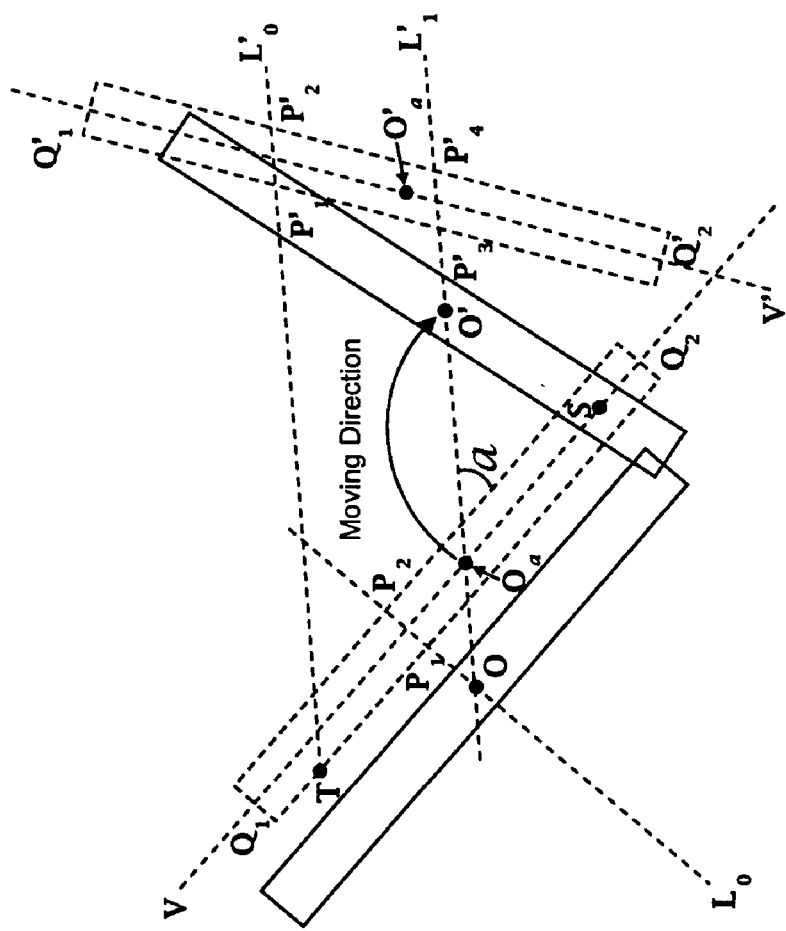
FIG. 15 is a diagram illustrating a local scan pattern for locating a nanorod to be manipulated.

Although the position of a nanorod is represented by its center, length and orientation in the behavior models, the location of a nanorod is represented by its width and two ends in local scan for convenience. The center, length and orientation can be easily calculated through its width and two ends. The initial displayed rod width and ends are identified from a previously captured AFM image before the manipulation starts. Due to the thermal drift and model inaccuracy, the displayed position may not represent the actual position. The thermal drift usually causes translational errors, while the model inaccuracy causes both translation and orientation errors significantly. The actual two ends of a nano-rod can be recovered by two local scan actions before and after each manipulating operation. The local-scan-before-operation eliminates the thermal drift, while the local-scan-after-operation mainly minimizes the effects of model errors—correcting the final position of the rod The local-scan-before-operation needs at least two scanning lines, one or more lines perpendicular to the rod orientation and one line parallel to the rod orientation, as shown in the left part of FIG. 15. First, the nanorod is scanned using Line $L_0$, which passes through the displayed center of the rod and perpendicular to the rod orientation. If the rod is not found, then the scanning line move up and down alternatively by a distance of 1/4L until the rod is found, where L is the rod length. Once the rod is found, the scanning line forms two intersection points with the boundary of the rod, $P_1$ and $P_2$. Another line, V, which goes through the midpoint between $P_1$ and $P_2$ and parallel to the rod orientation, is scanned to find the actual two ends of the rod. The scanning line, V, has two intersection points with the boundary of the rod, $Q_1$ and $Q_2$. These two points are the actual two ends of the rod. The actual rod center, orientation can be calculated correspondingly. The pushing operation will be performed immediately based on the actual position of the rod. The local scanning range (the length of the scanning line, l) is determine by the maximum random drift such that $l > d + r_{max}$, where d is the rod width For the local-scan-after-operation, at least three scanning lines are needed as shown in the right part of FIG. 15. First, the nanorod is scanned using Line $L'_0$, which passes through the initial pushing point, T, and along the pushing direction, $O_a O'$, as shown in FIG. 15. If the rod is not found, then the scanning line goes along Line $O_a O'$. If the rod is still not found, the scanning action continues by moving the scan line up and down by a distance of 1/4L sin α until two scan lines can locate the rod, where α is the angle between the pushing direction and the initial rod orientation. Each of the two scan lines has two intersection points with the boundary of the rod. For example $P'_1$ and $P'_2$ for Line $L'_0$, $P'_3$ and $P'_4$ for Line $L'_1$ Another line, V', which goes from the midpoint between $P'_1$ and $P'_2$ to the midpoint between $P'_3$ and $P'_4$, is scanned to locate the two actual ends of the rod. The scanning line, V', has two intersection points with the boundary of the rod, $Q'_1$ and $Q'_2$. These two points are the actual ends of the rod. The local scanning range (the length of the scanning line, l') is determine by the maximum random drift and the pushing distance such that $l' > \Delta + 2(d + r_{max})$, where $\Delta$ is the pushing distance (the tip moving distance during pushing). The visual display is updated immediately after the actual position obtained. The updated position will work as the new reference for the next operation on the same rod. The system is ready for next manipulating operation after updating the image with the final actual position of the manipulated nanorod This general framework can manufacture nanostructures not only by manipulating nanoobjects, but also by removing materials from the surface. Similarly, the steps include: designing a CAD model of a nanostructure; removing materials from the surface using the tip of an AFM, for example, nanotrenches or nanoholes can be created by pushing the AFM tip into the surface; also nanoobjects can be pushed into the nanotrenches or nanoholes to form the designed nanostructures if necessary.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automated nanomanipulation system for manufacturing a nanoscale structure, comprising:
    a design model for a nanoscale structure comprised of two or more nanoobjects;
    image data of a sample surface upon which the nanoscale structure is to be manufactured, the sample surface having a plurality of randomly distributed nanoobjects from which the nanoscale structure is formed;
    a movable member configured to perform a nanomanipulation operation on the sample surface;
    a path planning subsystem adapted to receive the design model and the image data and operable to generate path data is indicative of a path for traversing the movable member along the sample surface such that the movable member manipulates one or more randomly distributed nanoobjects in accordance with the design model, and the path data.

2. The automated nanomanipulation system of claim 1 wherein the path planning subsystem is operable to identify available nanoobjects and environment from the image data.

3. The automated nanomanipulation system of claim 1 wherein the path planning subsystem is operable to determine possible direct paths between the randomly distributed nanoobjects and destination for the nanoobjects as specified by the design model, where a direct path is a straight line without any obstacles between a nanoobject and a destination, and to assign nanoobjects having a direct path to a destination using a minimum distance criterion.

4. The automated nanomanipulation system of claim 3 wherein the path planning subsystem is further operable to determine a number of destinations which are obstacles along the path of each assigned nanoobject and to set a manipulation path for the assigned nanoobject having the highest number of obstacles.

5. The automated nanomanipulation system of claim 3 wherein the path planning subsystem is further operable to determine possible indirect paths between the randomly distributed nanoobjects and unassigned destinations, where an indirect path avoids any obstacles between a nanoobject and an unassigned destination, and to assign a randomly distributed nanoobject having an indirect path to a destination using a minimum distance criterion.

6. The automated nanomanipulation system of claim 1 further comprises a computer-aided design tool for constructing the design model for the nanostructure.

7. The automated nanomanipulation system of claim 1 further comprises a simulation subsystem adapted to receive the path data and operable to visually simulate the path data.

8. The automated nanomanipulation system of claim 1 further comprises an atomic force microscope, wherein the movable member is further defined as a tip of a cantilever of the atomic force microscope.

9. The automated nanomanipulation system of claim 8 further comprises a user interface in data communication with the atomic force microscope and operable to display the sample surface in real-time as the tip of the cantilever traverses the sample surface.

10. The automated nanomanipulation system of claim 1 further comprises a local scan subsystem in a data communication with the atomic force microscope to perform a local scan for a nanoobject and update the path data based on positional information for the nanoobject prior to manipulating the nanoobject.

11. An automated method for constructing nanoscale structures, comprising:
    providing a design model for a nanoscale structure comprised of two or more nanoobjects, where the design model defines a spatial relationship between the nanoobjects which form the nanoscale structure;
    identifying available nanoobjects on a sample surface upon which the nanoscale structure is to be constructed;
    determining manipulation paths for at least one of the available nanoobjects in accordance with the design model, where the manipulation path accounts for an attraction force between the available nanoobjects and any obstacles in close proximity to the manipulation path.

12. The automated method of claim 11 further comprises constructing the design model using a computer-aided design (CAD) tool.

13. The automated method of claim 11 further comprises manipulating the at least one available nanoobject in accordance with the manipulation paths using an atomic force microscope.

14. The automated method of claim 13 further comprises simulating the manipulation paths prior to the step of manipulating.

15. The automated method of claim 13 further comprises adjusting the manipulation paths prior to the step of manipulating.

16. The method of claim 11 wherein the step of identifying available nanoobjects further comprises imaging the sample surface using an atomic force microscope.

17. The method of claim 16 wherein the step of identifying available nanoobjects further comprises identifying available nanoobjects using a neighboring relationship of pixels from an image of the sample surface.

18. The method of claim 11 wherein the step of determining manipulation paths further comprises computing a minimum distance between an available nanoobject being manipulated and any obstacle in close proximity of the manipulation path to avoid the attraction force caused in part by the van der Waals force.

19. The automated method of claim 11 wherein the design model defines a destination for each of the nanoobjects which form the nanoscale structure and the step of determining manipulation paths further comprises
    determining possible direct paths between the randomly distributed nanoobjects and the destinations for the nanoobjects as specified by the design model, where a direct path is a straight line without any obstacles between a nanoobject and a destination;
    assigning a randomly distributed nanoobject having a direct path to a destination using a minimum distance criterion;
    determining a number of destinations which are obstacles along the path of each assigned nanoobject;
    setting a manipulation path for the assigned nanoobject having the highest number of obstacles.

20. An automated method for determining manipulation paths for nanoobjects which form a nanoscale structure, the nanoscale structure constructed from randomly distributed nanoobjects on a sample surface and in accordance with a design model that defines destinations for the nanobjects which form the nanoscale structure, comprising:

determining possible direct paths between the randomly distributed nanoobjects and the destinations for the nanoobjects as specified by the design model, where a direct path is a straight line without any obstacles between a nanoobject and a destination;

assigning a randomly distributed nanoobject having a direct path to a destination using a minimum distance criterion;

determining a number of destinations which are obstacles along the path of each assigned nanoobject;

setting a manipulation path for the assigned nanoobject having the highest number of obstacles.

21. The automated method of claim 20 further comprises identifying any unassigned destinations of the nanoscale structure and determining possible indirect paths between the randomly distributed nanoobjects and the unassigned destinations, where an indirect path avoids any obstacles between a nanoobject and an unassigned destination, and assigning a randomly distributed nanoobject having an indirect path to a destination using a minimum distance criterion prior to determining a number of destinations which are obstacles.

22. The automated method of claim 20 further comprises setting the manipulation path for the assigned nanoobject having the shortest path when two or more assigned nanoobjects have an equal number of obstacles in its path.

23. The automated method of claim 20 further comprises generating a topographical representation of the sample surface, updating the topographical representation to reflect the manipulation of the assigned nanoobject having the highest number of obstacles and repeating the process until a manipulation path is set for all of the destinations of the nanoscale structure.

24. A method for drift compensation when constructing a nanoscale structure from randomly distributed nanoobjects on a sample surface, comprising:

determining positional information for randomly distributed nanoobjects on the surface upon which the nanoscale structure is to be constructed;

determining manipulation paths for one or more of the nanoobjects in accordance with a design model;

confirming the positional information of a given nanoobject prior to manipulating the given nanoobject; and adjusting the manipulation path for the given nanoobject when the positional information for the given nanoobject has changed.

25. The method of claim 24 wherein the step of confirming the position information further comprises performing a local scan of the sample surface to determine a current position of the given nanoobject.

26. The method of claim 25 wherein the step of performing a local scan further comprises scanning for the given nanoobject along a first scan line which passes through an anticipated origin of the nanoobject and scanning for the nanoobject along at least one additional line perpendicular to the first scan line.

27. The method of claim 24 further comprises manipulating the given object to a destination position in accordance with the adjusted manipulation path.

28. The method of claim 27 further comprises performing a local scan of the sample surface after the manipulation operation to determine the destination position of the given nanoobject, and further manipulating the position of the given nanoobject based on the destination position as determined by the local scan.

* * * * *